Figure 1:
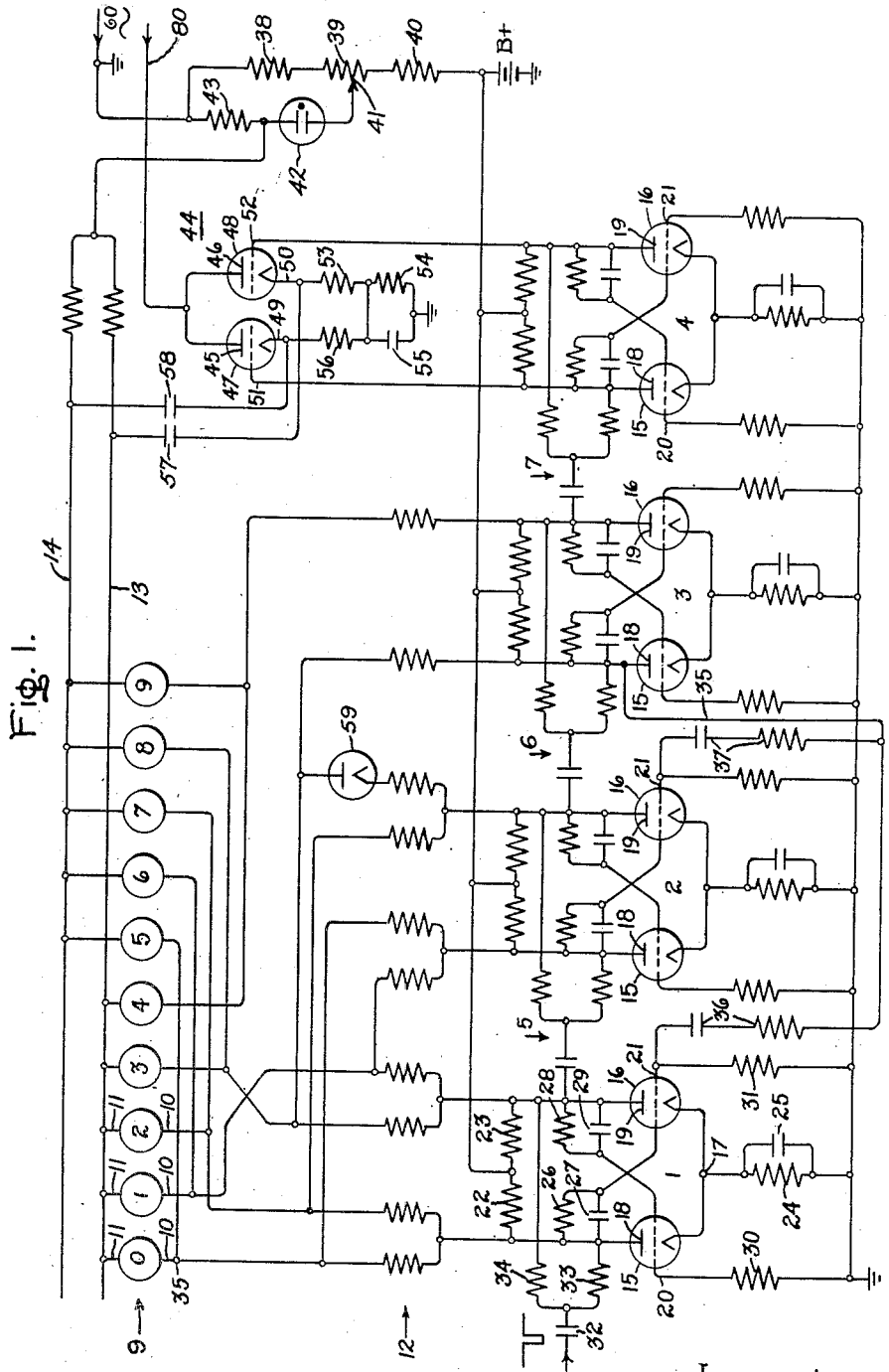

Inventor:
Raymond A. York,
by Merton D. Moore
His Attorney.

Sept. 18, 1956  R. A. YORK  2,763,432
ELECTRONIC COUNTER INDICATOR
Filed Aug. 22, 1950  2 Sheets-Sheet 2

Inventor:
Raymond A. York,
by Merton D. Munn
His Attorney.

United States Patent Office 2,763,432
Patented Sept. 18, 1956

2,763,432

ELECTRONIC COUNTER INDICATOR

Raymond A. York, Syracuse, N. Y., assignor to General Electric Company, a corporation of New York Application August 22, 1950, Serial No. 180,855

2 Claims. (Cl. 235—92)

This invention relates to electronic counters and particularly to the type capable of providing a running count indication.

Electronic counting systems capable of delivering an electrical output pulse for a predetermined number of applied electrical input pulses have been known for some time. A basic counting unit commonly employed in electronic counters has been a multivibrator having two states of stability such that it provides a single output pulse upon the application of two pulses to its input circuit. Starting with this basic multivibrator circuit as a basic scale of two, or binary counter, it is apparent that a counting system to any scale in powers of two may be constructed by joining multivibrators in cascade. Thus four such multivibrators, or binary counters, connected in cascade provide a scale of 16, that is the fourth counter in the cascaded chain provides one output pulse for every 16 pulses applied to the input of the first counter.

In the event it is desired to provide an indication of each individual count rather than a totalized count indication, additional circuitry must be resorted to. In the past this additional circuitry has been relatively complex and extensive and of such a nature that the individual count indication has been strongly affected by the tolerances of the associated circuit parameters, the electron discharge devices forming the basic multivibrator counting units, and instabilities in the power supply energizing the multivibrators.

An object of my invention is to provide an improved count indicating system for electronic counters.

Another object of my invention is to provide an improved count indicating system for the multivibrator type of scaler which is substantially independent of variations in the constituent circuit elements and the system power supply.

A further object of my invention is to provide a more reliable triggering circuit for operating count indicators employed in electronic computers.

A still further object of my invention is to provide an improved count indicating system for the multivibrator type of scaler while employing a minimum of circuit components.

In accordance with one embodiment of the invention, applicable to binary counting circuits employing multivibrators energized from a substantially unregulated power source, neon lamps employed for indicating each count are operated by the difference in potential existing solely between the non-conducting anodes of groups of multivibrators and a reference potential regulated with respect to the potential of said power source. To reduce the number of multivibrator anode voltages which must be combined to distinguish between stored counts, certain of the neon lamps are arranged to be operated by the same set of anode voltage conditions and an alternating potential superimposed on the reference potential supplied a desired neon lamp for causing it to operate.

Figure 2:
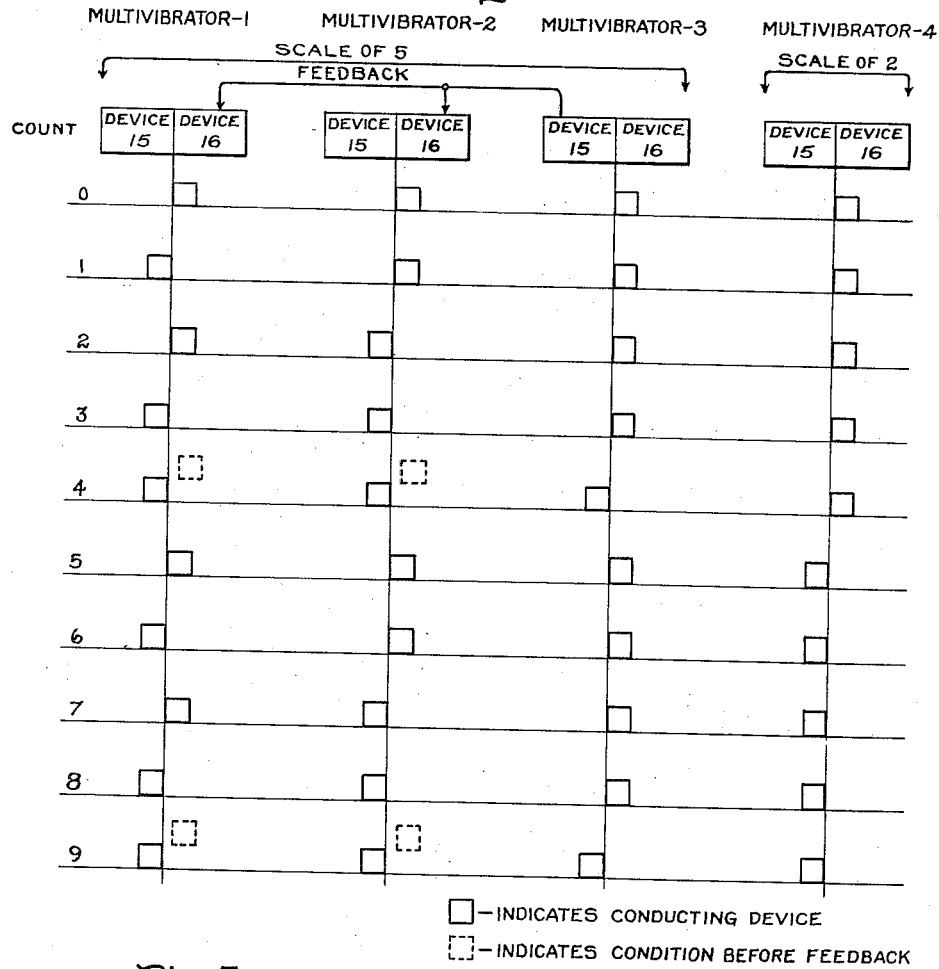
Figure 3:
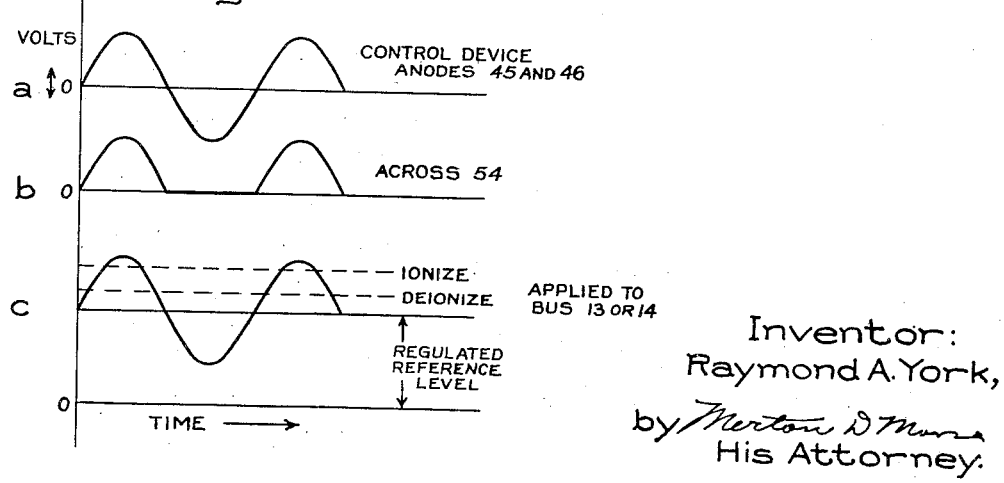

The novel features which I believe to be characteristic of my invention are set forth with particularity in the appended claims. My invention however both as to its organization and method of operation together with further objects and advantages thereof may best be understood by reference to the following description taken in connection with the accompanying drawings in which Fig. 1 shows in circuit diagram form a preferred embodiment of the invention; Fig. 2 indicates graphically the relationship existing between multivibrator stages and the count stored in the scaling unit of Fig. 1 and Fig. 3 illustrates graphically the nature of the component voltages employed in actuating the indicator lamps of Fig. 1.

Referring to Fig. 1 there is disclosed a decade scaling unit employing four scale of two multivibrators, 1—4, connected in cascade by connections 5, 6, 7 such that the output of the last multivibrator 4 comprises one pulse occurring for every ten input pulses applied over lead 8 to multivibrator 1. Individual neon lamps, 9, each comprising two terminals 10 and 11, are provided for indicating each count from zero to nine. The neon lamps are actuated by the potential difference existing between various multivibrator outputs as available over resistances 12 and the potential of busses 13 and 14, which, as will be explained later, is controlled by the operation of multivibrator, 4, operating as a scale of two.

The basic multivibrator circuit which is utilized as a binary counter comprises two triode sections 15 and 16 having a common cathode connection 17, a pair of anodes 18 and 19, and associated control electrodes 20 and 21 respectively. The anodes 18 and 19 are connected through resistors 22 and 23 to a source of operating potential indicated by B+. The common cathode connection 17 is connected to ground through a resistor 24 in parallel with the capacitor 25. Cross connections between anodes and control electrodes of the two halves or sections of the multivibrator are provided by a paralleled resistor and capacitor 26 and 27 between anode 18 and control electrode 21 and by a paralleled resistor and capacitor 28 and 29 between anode 19 and control electrode 20. Control electrodes 20 and 21 are connected to ground through resistors 30 and 31 respectively. Negative input signals to the scaler are applied over lead 8 through a coupling capacitor 32 to the junction of a pair of coupling resistors 33 and 34 connected respectively to the anodes 18 and 19 of the multivibrator. The output signals or pulses from the multivibrator are available at the anode 19.

The circuit arrangement for the remaining multivibrators is identical and hence similar reference numerals are applied to corresponding parts. Connections 5, 6 and 7 provide the cascade coupling between multivibrator stages.

For purposes of reliability, it is desirable that the multivibrator respond to pulses of one polarity only. The particular circuit arrangement disclosed is designed to operate on negative pulses only. Moreover, the normal or zero count state of the multivibrator is that in which device 16 is conducting and the device 15 is non-conducting as shown in Fig. 2. Whenever the circuit is in its normal state it may be changed to its other stable state, that is, where device 15 is conducting and device 16 is non-conducting, by the application of a negative pulse to lead 8. This negative pulse appearing at the control electrode of a non-conducting triode has no effect while its appearance at the control electrode of a conducting triode results in cutting off this triode portion resulting in a positive signal being applied to the other non-conducting triode to cause it to conduct. Thus in the case of the first negative pulse being applied to condenser 32, this negative pulse appears at the control electrode 21 over condenser 27 and current to anode 19 is cut off causing a reversal of the state of the multivibrator. The resultant positive going voltage at anode 19 is applied through resistor 28 and condenser 29 to grid 20 causing device 15 to conduct. Current flow of device 15 through resistor 24 maintains device 16 cut off. A subsequent negative pulse appearing at condenser 32 is applied to control electrode 20 over condenser 18 thereby cutting off current flow in device 15. This in turn results in a positive going voltage being applied to grid 20 over 18 and 26 causing device 16 to conduct and thereby returning multivibrator 1 to its original state. The functioning of this particular type of multivibrator input circuit is discussed in greater detail in U. S. Patent 2,554,994, entitled "Electronic Switching Circuit" and assigned to the same assignee as the present application.

Since each of the multivibrators 1 through 4 constitute a binary counter, their connection in cascade constitutes a counting chain to a scale of 16 which provides a single output pulse at anode 19 of multivibrator 1 for every 16 negative pulses applied to condenser 32. It is well known in the art that a chain of binary counters may be converted to count to a scale other than an integral power of two by feeding back pulses corresponding to a particular count to preceding counters in the chain. The popularity of the decimal system of counting makes it especially desirable to transform the binary chain of counting into decimal indications. In the embodiment of Fig. 1 a simultaneous type of feedback is employed for achieving a decimal counting system. This feedback comprises a connection 35 coupling the output of anode 18 of multivibrator 3 through a series connected capacitor and resistor 36 to the control electrode 21 of multivibrator 1. A similar connection is provided from the output of anode 18 of multivibrator 3 over lead 35 through a series connected capacitor and resistor 37 to the control electrode 21 of multivibrator 2. The feedback voltage from anode 18 of multivibrator 3 is transmitted to grids 21 of multivibrators 1 and 2 to alter the normal states of multivibrators 1 and 2 which would otherwise have existed. It will be recalled that the basic multivibrator circuit employed will only respond to negative pulses applied to its grid. A negative going voltage is developed at anode 18 of multivibrator 3, the source of feedback signals, only at the counts of 4 and 9. Without the feedback connection 35, the devices 16 of multivibrators 1 and 3 would have been rendered conductive upon the arrival of the fourth and ninth input pulses at the counter input connection 8. However, with the feedback connection, the negative going voltage developed at anode 18 of multivibrator 3 at the four and nine count, prevents devices 16 of multivibrators 1 and 2 from becoming conductive, thereby rendering devices 15 conductive instead. The feedback at the counts of four and nine has the effect of advancing the count such that an output pulse is delivered from multivibrator 4 sooner than would have been possible without the feedback. Actually, the feedback advances the count such that upon the application of the tenth pulse to connection 8, devices 16 of multivibrators 1 through 4 are returned to their conductive state as shown for the count of zero, and a negative output pulse is delivered at anode 19 of multivibrator 4.

Referring to Fig. 2 of the drawings, it is seen that it is always a discreet combination of multivibrator conditions, that is conduction or non-conduction of the component electron discharge devices, which accurately describes each count from zero to nine. Thus it is possible to operate individual count indicating circuits such as the lamps 9 shown in Fig. 1 by providing an arrangement rendering each lamp operative in response to a distinct set of multivibrator conditions as evidenced by the voltages existing at the anodes of the various multivibrator triodes.

Referring to Fig. 1 it is noted that the firing of the indicator lamps 9, chosen to be of the neon type, is effected by having the lower terminal 10 of each lamp energized from a set of voltages existing at the anodes of various multivibrator combinations, and its upper terminal, 11, energized by a voltage to be made available over either bus 13 or 14, as will be explained shortly. For example, the count of zero is identified by connecting the lower terminal 10 of the 0 count neon lamp through respective coupling resistors 12 to the anodes 18 of multivibrators 1 and 2. To register the count of 1, the 1 count neon lamp has its lower terminals 10 connected to anode 19 of multivibrator 1 and anode 18 of multivibrator 2 through corresponding coupling resistors 12. Similarly for the other count indications it is seen that the voltages at various multivibrator anode combinations are employed for operating the respective neon lamps. One feature of applicant's invention lies in the fact that only the voltages existing at the anodes of non-conducting devices of the multivibrators are employed to fire the neon lamp identifying the particular count stored in the counting system. When the anode of a multivibrator, for example 18 of 1 is non-conducting, the potential is almost entirely determined by a network of resistances 23, 28 and 30 connected between B+ and ground. Hence the potential at the anode 18 is proportional to line voltage and is little affected by the tube characteristics which would be the case if the voltage at a conducting anode were employed for operating the neon lamp. Since the potential at all multivibrator anode 18 or 19, during non-conduction, are controlled by similar resistance networks 23, 28 and 30 connected between B+ and ground, these potentials are always proportional to B+. The voltages existing at the anodes of non-conducting electron discharge devices can be adjusted to be equal such that upon combination for firing a respective neon lamp, the same voltage will be made available for firing each lamp from zero through nine. This would not be possible if the voltages from conducting anodes were combined since electron discharge device tolerances, aggravated by aging would be effective.

Another circuit condition having considerable effect on the reliability of count indication is instability in the power supply or B+ energizing the electron discharge paths of the multivibrator devices, and the previously mentioned resistor networks of the various multivibrator stages. To substantially eliminate this effect, in accord with my invention, a voltage is supplied to busses 13 and 14 which is regulated with respect to the B+ potential energizing the multivibrator circuits. Controlling operation of the respective neon lamp indicators by the potential difference existing between the potential at the anodes of non-conducting electron discharge devices, energized from a common B+ source, and a reference potential available at busses 13 and 14 also determined by the same B+ source, eliminates dependence of the count indicating circuit on the absolute magnitude, and hence variations in the B+ supply. The voltage for busses 13 and 14, to which the other terminals 11 of the neon lamps are connected, is normally controlled by the bleeder resistance network 38, 39 and 40 connected across the source of operating potential B+. By adjusting the movable tap on the bleeder resistor 39, the voltage at point 41 may be adjusted to be equal in value to that existing at the anode of a non-conducting multivibrator electron discharge device and will remain equal irrespective of line voltage fluctuations. A voltage regulator device 42, of the gaseous type is connected by resistor 43 between point 41 and ground. The regulator device 42 has the characteristic of maintaining a constant voltage drop across its terminals even when energized from a potential source which is variable over a wide range of voltages and is well known in the art. The voltage drop across this voltage regulator device 42 is inserted between point 41 and the busses 14 and 13 to provide a fixed reference potential across the neon lamps which is little affected by line voltage changes. Thus by insuring that the relative potential existing between the anodes of non-conducting devices and the busses is always maintained constant, satisfactory operation of the indicating circuit is achieved despite wide voltage fluctuations of the B+ source. It should be noted that the bleeder, comprising resistor 38, 39 and 40, used to establish the voltage at point 41, together with the regulator tube 42 need occur only once in an equipment. This circuit can supply a reference voltage to several scaling circuits.

Referring to Fig. 1 again, it is seen that the lower terminals 10 of the zero and the five count neon lamp are tied to the same set of multivibrator anodes, i. e. anodes 18 of multivibrators 1 and 2 through respective coupling resistors 12. Similarly the 1 and 6 count neon lamps, the 2 and 7 count neon lamps etc., are each paired to a respective multivibrator output combination. This ambiguity of indication, that is, where two neon count lamps 0—5, 1—6, 2—7, 3—8 and 4—9 would operate under the same set of anode voltage conditions, may be resolved by controlling the voltage at the upper terminals 11 of each neon lamp. Accordingly the upper terminals of each neon lamp pair are connected to a separate bus 13 or 14 and selection of which lamp in a pair is to be fired is controlled by the voltage applied to an appropriate bus by means of control circuit 44. In practice, the voltage point 41 is adjusted so that none of the neon lamps 9 will light until an additional signal has been added to one of the busses 13 or 14. This additional signal is supplied by control circuit 44 as a result of potentials supplied due to operation of multivibrator 4.

It is seen that conduction at the respective anodes of multivibrator 4 is altered during the transition from the four to the five count thereby providing a control signal for effecting selection of a neon lamp in a pair being energized from the same multivibrator anode combination. For reasons to be explained later this additional signal is an alternating voltage which is superimposed on the regulated voltage normally available at busses 13 and 14. This alternating signal, is supplied over conductor 80 between the anodes 45 and 46 of devices 47 and 48, and ground. These devices are connected to act as cathode followers with load resistances 56 and 53 respectively connected between their cathodes and ground, and their cathodes coupled through respective condensers 58 and 57 to busses 14 and 13. In this way a rectified or clipped alternating current wave is produced at the cathodes 49 or 50 by cathode follower action and depending upon which of grids 51 and 52 is the more positive. The two grids 51 and 52 of devices 47 and 48 are connected to the anodes 18 and 19, respectively, of multivibrator 4. Assuming the anode 19 of multivibrator 4 is non-conducting, its potential will be substantially higher than that of anode 18 of 4. Grid 52 of device 48 will therefore be at a more positive potential than grid 51 of device 47. Since 52 is at a higher potential than grid 51, the electron discharge current of device 48 flowing through the cathode load resistors 53 and 54 will develop a potential across smoothing condenser 55 which exceeds the potential of grid 51 of device 47 with the result that no current flows in 47. The half cycles of alternating voltage produced across resistor 53 are transmitted by condenser 57 to bus 13. Condenser 57 operates to smooth out these half cycle waves into alternating waves while permitting the alternating wave to be superimposed on the regulated voltage of the busses. Lamps indicating the count of 0, 1, 2, 3 or 4 are now ready to light as a result of the alternating current signal superimposed on the regulated unidirectional voltage of bus 13 as shown in graph c of Fig. 3. The particular lamp that lights will be selected by the anode voltage conditions of multivibrators 1, 2 and 3. If the conductive condition of multivibrator 4 is reversed, the electron discharge current flow of device 47 flowing through resistors 56 and 54 biases device 48 to non-conduction and transmits the half cycle alternating voltage waves developed across resistor 56 through coupling condenser 58 to bus 14. Thereupon, lamps indicating the count of 5, 6, 7, 8, or 9 are ready to light.

The control circuit 44 has several unique features. First its operation depends only on a difference of potential existing between the anodes of multivibrator 4 and hence is only slightly affected by line voltage or electron discharge device variation. The alternating potential available for energizing the electron discharge paths of devices 47 and 48 is maintained at a sufficiently high value so that its fluctuation in no way affects cathode follower output. A second feature of this circuit is that the neon lamps are lighted with an alternating current signal and thus becomes a much more sensitive indicator than when used in a direct current circuit. This is because the neon lamp extinguishes on each cycle and ignites again only when the ionization potential is reached as shown in Fig. 3, graph c. As soon as the peak voltage drops below the ionization potential level, the lamp fails to ignite on the succeeding cycle. A neon lamp operated in this manner is sensitive to about a one half volt change as compared to the ten or fifteen volt change usually required in a direct current system.

The high voltage end, 10, of each lamp 9 is coupled to the appropriate multivibrator anodes by resistors 12. In all cases except lamps indicating the counts of 3 and 8, two voltages must be combined to identify the count. On counts 3 and 8, three voltages must be considered. A diode 59 has been employed to prevent these particular lamps lighting except when anode 19 of multivibrator 2 is non-conducting. By the use of the diode 59, a consistent two components of anode voltage are provided for firing any one of the indicator lamps. In a preferred embodiment the high end of each neon lamp, namely that coupled through the resistors 12 to the respective anodes of the multivibrators, receives a lighting voltage increment equal to substantially one half that of a multivibrator anode swing.

Referring to Fig. 2, there is shown the states of conduction and non-conduction of the various electron discharge devices 15 and 16, forming the multivibrators 1—4, for various counts stored in the counter of Fig. 1. The four vertical columns correspond to the respective multivibrators 1—4 and the horizontal columns correspond to a respective number of pulses applied to the counter. Thus in the initial state, that is, with no pulses applied to the counter, electron discharge devices 16 of multivibrators 1—4 are conducting while the devices 15 are non-conducting. Upon application of a single input pulse for the count of one, device 15 of multivibrator 1 conducts while device 16 becomes non-conducting. A study of Fig. 2 will reveal a distinct set of conducting and non-conducting devices for each count from zero to nine. Upon application of the fourth and ninth pulses to the counter, the normal states of conduction of the devices of multivibrators 1 and 2 are altered by feedback to advance the count and provide an output pulse at the output multivibrator 4 at the count of 10 rather than at the count of 16. That is, upon arrival of the fourth and ninth pulses, devices 16 of multivibrators 1 and 2 would normally be conducting. However due to the feedback connection, the conduction of device 15 of multivibrator at these counts causes devices 16 of multivibrators 1 and 2 to be cut off and devices 15 are cut off and devices 16 conduct. This corresponds to the zero count with conduction of device 16 of multivibrator 4 delivering a negative going voltage at its anode.

Fig. 3 illustrates the waveforms of the various voltages employed in firing the neon lamp indicators. The alternating potential shown in graph a is half wave rectified as shown in graph b by the control circuit 44 and routed to the appropriate bus under control of the scale of two multivibrator. The capacitive coupling employed, smooths the half wave rectified voltage before applying it to an appropriate bus for superior position on the regulated reference voltage available from the voltage regulator device. As shown in graph c, the alternating and regulated reference voltage are so dimensioned with respect to the voltages derived from the various multivibrator anodes such that the neon lamps will ionize and deionize on positive going half cycles of the alternating voltage.

Applicant's arrangement, as disclosed, is capable of providing a reliable count indication under the most adverse circuit conditions. By maintaining the busses for the scale of five, namely 13 and 14, at a fixed non-varying potential with respect to a potential source which may be varying and which may be employed as the anode voltage for the multivibrator electron devices, and by using the non-conducting anodes in all cases for firing the lamp indicators, the multivibrator tube characteristics and circuit parameter tolerances are reduced to unimportant role. Furthermore, the problem of regulating the B+ voltage for the scaler circuits in the case of a large register involving many tubes is no longer essential since the use of a direct current regulating circuit in connection with busses 13 and 14 provides satisfactory operation by having the bus voltage follow B+ source variations. By superimposing an alternating signal on the regulated direct voltage of the busses, more reliable operation of the neon lamps is obtained as previously mentioned. Also by employing the voltage at the non-conducting electron discharge device of the multivibrator 4, operating as a scale of two counter, to bias off one triode portion of the control circuit 44, while permitting the other triode portion to apply the alternating potential to an appropriate bus, the control circuit 44 operates only on the relative magnitude of the scale of two multivibrator anode voltages and the dependency on absolute magnitudes is erased.

The invention disclosed, although particularly applied to a decade scaler of the cascaded binary type employing feedback, may be easily adapted to other counting systems in which count indicating devices are combined to operate from the same set of voltage conditions. Furthermore, the invention may be employed where the use of a regulated reference voltage for a count indicating system is desirable, or where a need exists for increasing the sensitivity and reliability of count indication by the use of an alternating signal.

While a specific embodiment has been shown and described it will of course be understood that various modifications may be made without departing from the invention. The appended claims are therefore intended to cover any such modifications within the true spirit and scope of the invention.

What I claim as new and desire to secure by Letters Patent of the United States is:

1. An electronic counter comprising a plurality of counting units, means for energizing said units from a unidirectional potential source, a plurality of normally inoperative count indicators, means for deriving a unidirectional potential regulated to have a finite potential difference with respect to the potential of said source, a source of alternating potential, means for combining said regulated and alternating potentials, and means for operating respective ones of said indicators with the potential difference existing between said combined potentials and the resultant of a distinct set of voltages existing in said units due to a particular count being stored therein for indicating said count.

2. An electronic counter comprising a plurality of cascade-connected trigger circuits, each including a pair of electron discharge devices having their anode electrodes and their input electrodes cross-connected so that the devices of each pair become non-conductive alternately and conduction is stable in one or the other device of said pair, means for energizing said circuits from a source of unidirectional potential, two groups of indicators, each of said indicators having one terminal connected to a particular set of anodes of said devices all of which are non-conductive at the respective count represented by energization of that indicator and at least one of which is conductive at all other counts of said indicator, the other terminals of said groups being connected to a predetermined potential point on said potential source, a source of alternating voltage, electrical connections for applying said alternating voltage in series with the other terminal of one of said groups of indicators and said predetermined potential point during the conduction in one of the anodes of the last of said trigger circuits and for applying said alternating voltage in series with the other terminal of the other of said groups of indicators and said predetermined potential point during conduction in the other of the anodes of the last of said cascade-connected trigger circuits, the potential of said predetermined potential point and the magnitude of said alternating voltage being arranged such that an indicator is energized during the coincidence of non-conduction in the anodes of the respective set and of application of said alternating voltage to said indicator.

References Cited in the file of this patent
UNITED STATES PATENTS

| | | |
|---|---|---|
| 2,521,787 | Grosdoff | Sept. 12, 1950 |
| 2,521,788 | Grosdoff | Sept. 12, 1950 |
| 2,538,122 | Potter | Jan. 16, 1951 |
| 2,540,442 | Grosdoff | Feb. 6, 1951 |
| 2,547,511 | Weissman | Apr. 3, 1951 |
| 2,610,793 | Krause | Sept. 16, 1952 |
| 2,630,969 | Schmidt | Mar. 10, 1953 |

OTHER REFERENCES

"Electronic Digital Counters," by Warren H. Bliss; Electrical Engineering, April 1949, pages 309–314.